(12) United States Patent
Cheng

(10) Patent No.: US 7,417,339 B2
(45) Date of Patent: Aug. 26, 2008

(54) FAST TRANSITION POWER SUPPLY

(75) Inventor: Wing Ling Cheng, Taipo (HK)

(73) Assignee: Astec International Limited, Kwun Tong, Kowloon (HK)

( * ) Notice: Subject to any disclaimer, the term of this patent is extended or adjusted under 35 U.S.C. 154(b) by 375 days.

(21) Appl. No.: 11/060,230

(22) Filed: Feb. 17, 2005

(65) Prior Publication Data

US 2006/0181155 A1 Aug. 17, 2006

(51) Int. Cl.
*H01H 47/00* (2006.01)
*H01H 83/00* (2006.01)
*H02J 3/00* (2006.01)
*H02J 1/00* (2006.01)
*H03K 17/00* (2006.01)

(52) U.S. Cl. .................. 307/130; 307/112; 307/116; 307/125; 307/131

(58) Field of Classification Search .............. 307/130
See application file for complete search history.

(56) References Cited

U.S. PATENT DOCUMENTS

| | | | |
|---|---|---|---|
| 4,906,913 A | | 3/1990 | Stanojevic |
| 5,311,144 A | * | 5/1994 | Grasset ................ 330/252 |
| 5,430,365 A | | 7/1995 | Taylor et al. |
| 5,713,693 A | | 2/1998 | Lindenthal |
| 6,121,761 A | | 9/2000 | Herbert |
| 6,472,857 B1 | | 10/2002 | Genest et al. |
| 2002/0021150 A1 | * | 2/2002 | Tuchiya et al. ........... 327/108 |
| 2002/0093318 A1 | | 7/2002 | Wallis |
| 2003/0011247 A1 | * | 1/2003 | Kajiwara et al. ......... 307/125 |
| 2004/0232899 A1 | | 11/2004 | Herbet |

* cited by examiner

*Primary Examiner*—Michael J Sherry
*Assistant Examiner*—Adi Amrany
(74) *Attorney, Agent, or Firm*—Harness, Dickey & Pierce, P.L.C.

(57) ABSTRACT

A power supply includes at least one current source for providing current and a reference voltage generator for providing a first reference voltage and a second reference voltage. A control circuit selectively couples the current to the power supply output as a function of a monitored voltage, the first reference voltage, and the second reference voltage.

31 Claims, 4 Drawing Sheets

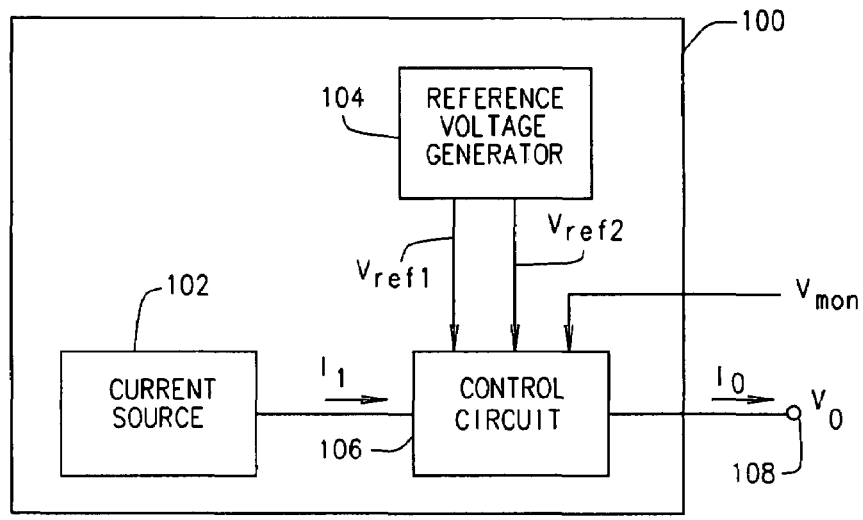
F I G . 1
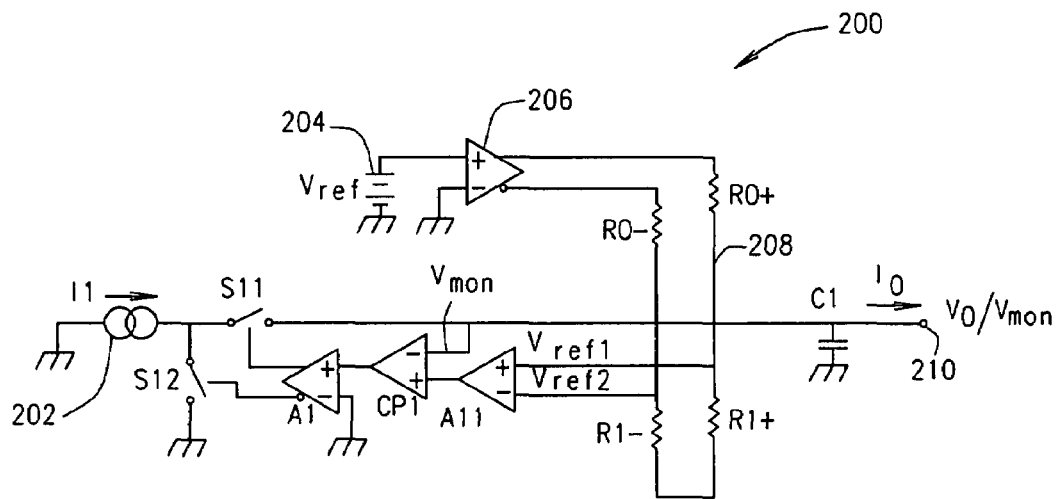
F I G . 2

FAST TRANSITION POWER SUPPLY

FIELD OF THE INVENTION

The present invention relates to electric power supplies including, for example, DC/DC converters and voltage regulation modules (VRMs).

BACKGROUND OF THE INVENTION

A wide variety of electric power supplies have been developed for use with integrated circuit and other devices. Some common examples include DC/DC converters and VRMs. In many applications, including those utilizing low voltage digital circuitry, such as microprocessors, the power supply must provide a fast dynamic response to changes or variations in the load or load requirements.

A typical DC/DC converter converts a DC voltage supplied from one or more power sources to a desired voltage. This can be accomplished using switching devices that selectively couple one or more current sources to the power supply output. By dynamically controlling the on/off timing of each switching device, the number of current sources supplying current to the output, and thus the amount of output current supplied to the load, can be dynamically controlled. This is particularly useful when, for example, a constant voltage across a variable load is desired.

As recognized by the inventor hereof, one disadvantage of many known power supplies is the effect of parasitics on circuit performance, including increased output noise levels, undesirable voltage ripple, and switching losses.

SUMMARY OF THE INVENTION

The inventor hereof has succeeded at designing power supplies that are capable of rapidly responding to changes in loads and/or load requirements, and that are less susceptible to parasitics as compared to prior art power supplies.

According to one aspect of the present invention, a power supply includes at least one current source for providing current and a reference voltage generator for providing a first reference voltage and a second reference voltage. A control circuit selectively couples the current to an output of the power supply as a function of a monitored voltage, the first reference voltage, and the second reference voltage.

According to another aspect of the present invention, a power supply includes a plurality of current sources, a plurality of control circuits, and a reference voltage generator that provides a plurality of reference voltage pairs. Each control circuit is associated with a different one of the current sources and a different one of the reference voltage pairs. Each control circuit selectively couples its associated current source to the power supply output as a function of a monitored voltage and its associated reference voltage pair.

According to yet another aspect of the invention, a power supply includes at least one current source, at least one differential reference voltage, an output, and at least one switch for selectively coupling the current source to the output when a difference between a monitored voltage and the differential reference voltage exceeds a predetermined value.

According to still another aspect of the invention, a power supply includes means for generating current, means for monitoring a voltage, means for generating a first reference voltage and a second reference voltage, and means for selectively coupling the current generating means to an output of the power supply as a function of the monitored voltage, the first reference voltage, and the second reference voltage.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

FIG. 1 is a block diagram of a power supply according to a first exemplary embodiment of the present invention.

FIG. 2 is a circuit diagram illustrating an exemplary implementation of the power supply shown in FIG. 1.

Like reference symbols indicate like elements or features throughout the drawings.

DETAILED DESCRIPTION OF EXEMPLARY EMBODIMENTS

Figure 3:
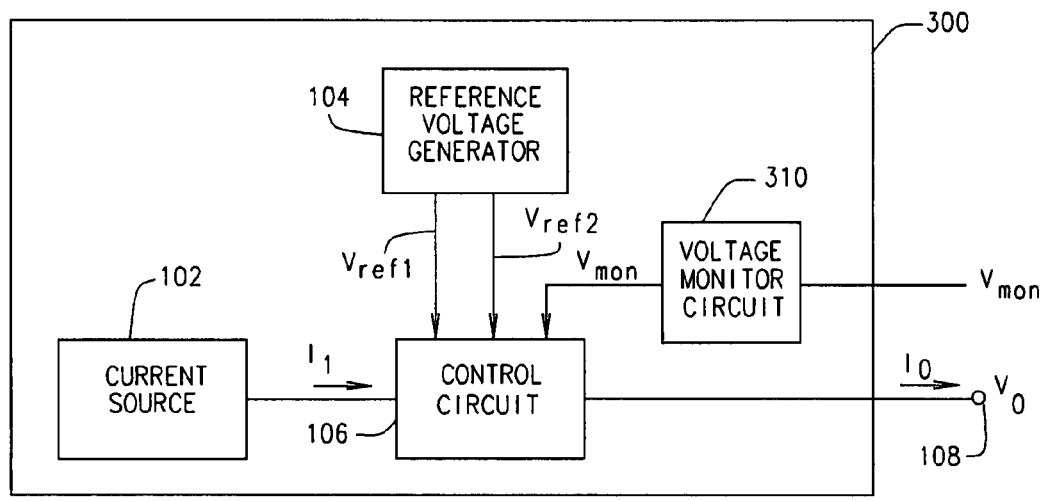
FIG. 3 is a block diagram of a power supply according to a second exemplary embodiment of the present invention.

A power supply according to a first exemplary embodiment of the present invention is illustrated in FIG. 1 and indicated generally by reference numeral 100. As shown in FIG. 1, the power supply 100 includes a current source 102 for providing a current $I_1$, a reference voltage generator 104 for providing a first reference voltage $V_{ref1}$ and a second reference voltage $V_{ref2}$, and a control circuit 106. The control circuit 106 is configured for selectively coupling the current $I_1$ to an output 108 of the power supply 100 as a function of a monitored voltage $V_{mon}$, the first reference voltage $V_{ref1}$ and the second reference voltage $V_{ref2}$. As should be apparent, a load (not shown) can be coupled to the power supply output 108 for utilizing the output voltage $V_O$ and/or output current $I_O$ of the power supply 100.

The monitored voltage $V_{mon}$ can be the power supply output voltage $V_O$ or any other voltage of interest. The current source 104 can be any type of current source including a constant current source for providing a constant current to the control circuit 106. Further, while not shown in FIG. 1, one or more capacitors can be coupled to the power supply output 108 for smoothing the output voltage $V_O$ and/or output current $I_O$.

FIG. 2 illustrates an exemplary circuit implementation 200 of the power supply 100 of the first embodiment. As shown in FIG. 2, the circuit 200 includes a current source 202 corresponding to current source 102 of FIG. 1. The circuit 200 further includes a DC voltage source 204 for providing a reference voltage $V_{REF}$, a differential amplifier 206, and a voltage divider circuit 208, including resistors RO+, RO−, R1+ and R1−, which together comprise the reference voltage generator 104 of FIG. 1. Further, the circuit 200 includes a comparator CP1, two differential amplifiers A1, A11, and two switches S11, S12 which together comprise the control circuit 106 of FIG. 1. Although two switches S11, S12 are shown in FIG. 2, it should be understood that more or less switches may be employed in the control circuit 106.

In the circuit implementation 200 of FIG. 2, the monitored voltage $V_{mon}$ is the output voltage $V_o$, which is coupled to one input of the comparator CP1. The other input of the comparator CP1 is coupled to the output of the differential amplifier A11, which provides an output indicative of the difference between the reference voltages $V_{ref1}$, $V_{ref2}$ provided by the voltage divider circuit 208.

In operation, the comparator CP1 compares the monitored voltage $V_{mon}$ with the output of the differential amplifier A11 and provides an output indicative of such comparison to the differential amplifier A1. The differential amplifier A1 functions as a switch driver and controls the switches S11, S12 for selectively coupling the current $I_1$ to the output terminal 210 or ground. In general, when the monitored voltage $V_{mon}$ is greater than the difference between reference voltages $V_{ref1}$, $V_{ref2}$, the current source 202 is coupled to ground via switch S12. When the monitored voltage $V_{mon}$ is less than the difference between the reference voltages $V_{ref1}$, $V_{ref2}$, the current source 202 is coupled to the output terminal 210 (and thus the load) via the switch S11. By controlling the timing of the switches S11, S12 in this manner, more or less output current $I_o$ can be provided by the circuit 200 for adjusting, in this case, the output voltage $V_o$ to a desired level. It should be understood that the circuit 200 is capable of operating at very high speeds so as to maintain the output voltage $V_o$ at a desired level, despite variations in the load (not shown) coupled to the output terminal 210.

In the exemplary circuit 200 of FIG. 2, the voltage divider circuit 208 is ungrounded. As a result, the difference between the reference voltages $V_{ref1}$, $V_{ref}2$ (as determined by differential amplifier A11) is generally constant. This is in contrast to providing a single-ended reference voltage to the control circuit relative to ground, where the ground voltage can vary at different physical positions in the circuit due to switching and load transients, which can cause false perturbation of the detected reference voltages and thus false activation of one or more switches. In the circuit of FIG. 2, because the voltage source 204 and the differential amplifier 206 are grounded at the same physical location, variations in the ground voltage at such location will generally not affect the values of the reference voltages $V_{ref1}$, $V_{ref2}$.

Further, in the exemplary circuit of FIG. 2, resistors R0+ and R0− have the same resistance value as one another, and resistors R1+ and R1− have the same resistance value as one another. As a result, reference voltages $V_{ref1}$ and $V_{ref2}$ are equal but opposite voltages, and together constitute a differential reference voltage. This differential reference voltage is converted to a single ended reference voltage common to the local ground by differential amplifier A11. This approach simplifies the circuit design, particularly where multiple current source stages are employed as described below. Alternatively, different resistance values can be employed for resistors R0+, R0−, R1+, R1−.

Preferably, the reference voltage Vref provided by the voltage source 204 is relatively large so as to provide the reference voltages $V_{ref1}$, $V_{ref2}$ with a good signal-to-noise (S/N) ratio. For example, the reference voltage $V_{ref}$ can be two or three times as great as the maximum output voltage $V_o$ of the circuit 200, or even greater.

As noted above, the exemplary circuit of FIG. 2 employs multiple switches as well as several differential amplifiers (including comparator CP1) and resistors. It should be understood, however, that other types and combinations of circuit devices can be employed to implement the reference voltage generator 104 and the control circuit 106 shown in FIG. 1.

A power supply 300 according to a second exemplary embodiment of the present invention is illustrated in FIG. 3. The power supply 300 is similar to the power supply 100 of FIG. 1, except for the addition of a voltage monitor circuit 310. The voltage monitor circuit 310 is configured for detecting the monitored voltage at a first location, and for providing the monitored voltage to the control circuit 106 at a second location irrespective of variations in the ground voltage at the first and second locations. As in the first embodiment, the monitored voltage $V_{mon}$ in the embodiment of FIG. 3 can be the output voltage $V_o$ of the power supply 300 or another voltage of interest.

Figure 4:
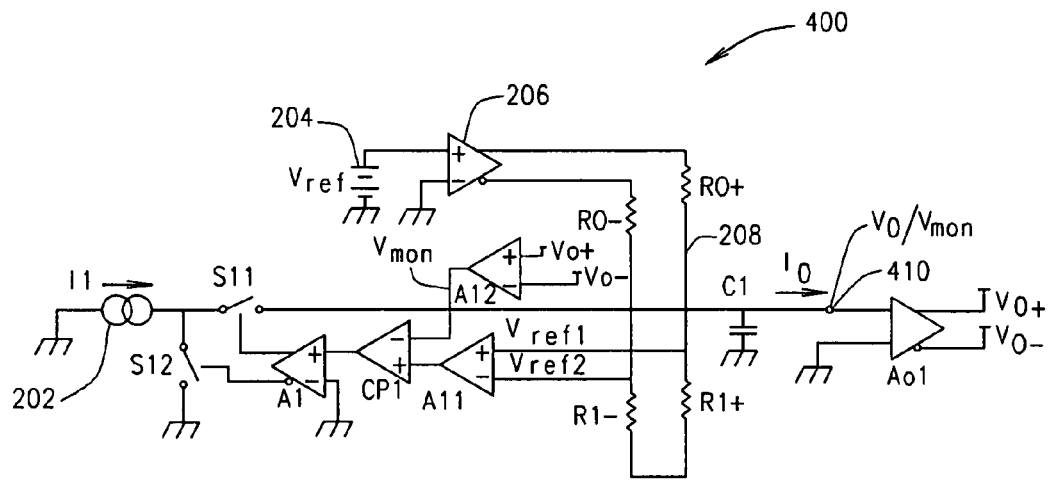
FIG. 4 is a circuit diagram illustrating an exemplary implementation of the power supply shown in FIG. 3.

FIG. 4 illustrates an exemplary circuit implementation 400 of the power supply 300 of the second embodiment. The circuit 400 is similar to the circuit 200 of FIG. 2, except for the addition of two differential amplifiers Ao1, A12 which together comprise the voltage monitor circuit 310 of FIG. 3. It should be understood, however, that other types and combinations of circuit devices may be used to implement the voltage monitor circuit 310.

With further reference to FIG. 4, the differential amplifier Ao1 detects the monitored voltage $V_{mon}$ (in this case the output voltage $V_o$) at or near the output terminal 410 and converts the monitored voltage $V_{mon}$ into a differential voltage (in this case a differential output voltage $V_o+/V_o-$). The differential voltage produced by differential amplifier Ao1 is provided to differential amplifier A12, which converts the differential voltage back to a single ended voltage common to the local ground, and provides this single ended voltage to the comparator CP1 as the monitored voltage $V_{mon}$. In this manner, the monitored voltage can be detected at one location and accurately provided to the comparator CP1 at a second location irrespective of variations in the ground voltage at the first and second locations. Without the voltage monitor circuit, differences in the ground voltage at the output terminal 410 and at the comparator CP1 could result in inaccurate detection of the monitored voltage $V_{mon}$ by the comparator CP1, which could result in false activation of the switches S11, S12.

Figure 5:
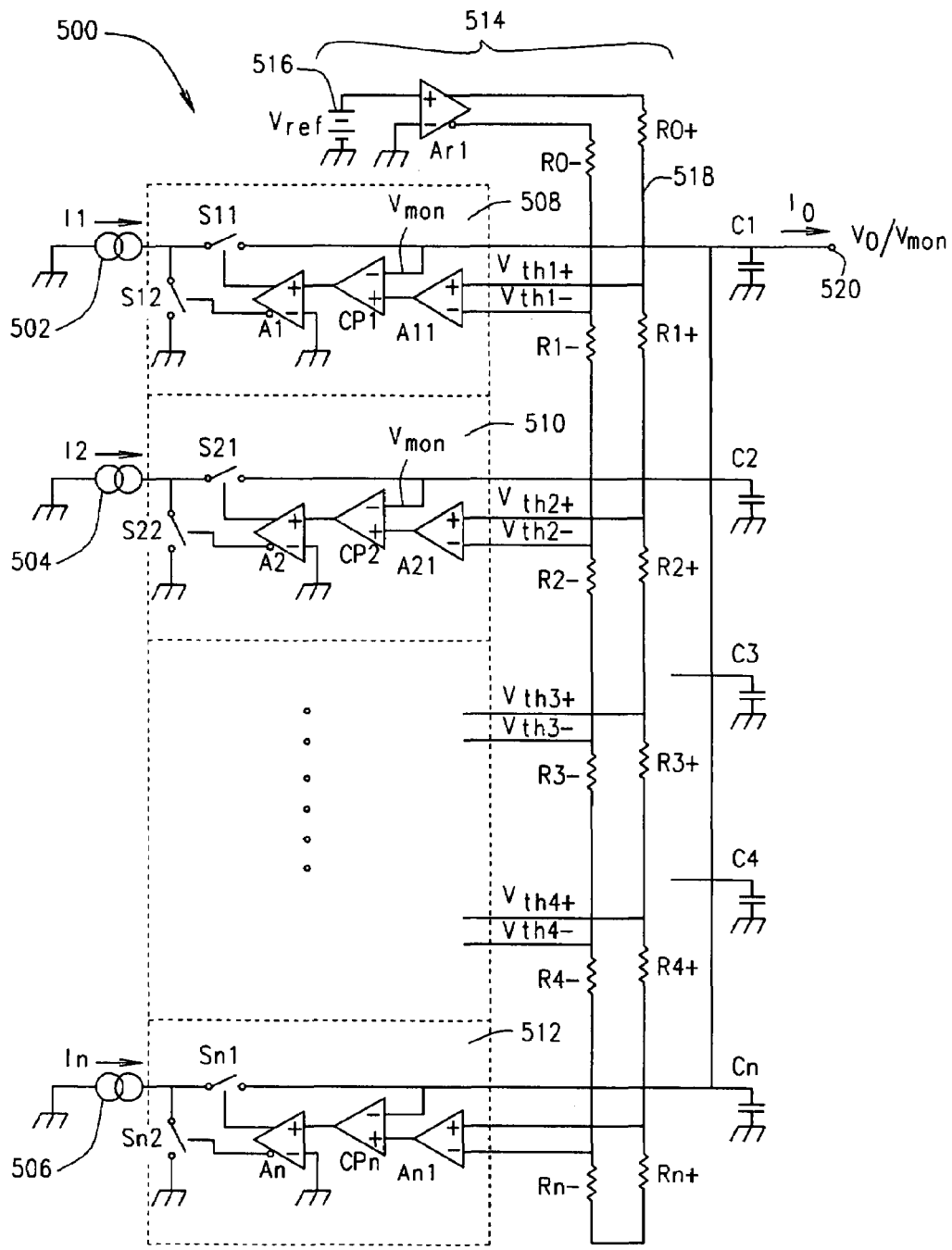
FIG. 5 is a circuit diagram illustrating an exemplary implementation of a power supply according to a third embodiment of the invention.

FIG. 5 illustrates an exemplary circuit implementation of a power supply 500 according to a third embodiment of the present invention. The circuit 500 is essentially a multi-stage implementation of the circuit 200 of FIG. 2. Each stage of the exemplary circuit 500 includes a current source 502, 504, ..., 506 for providing a current I1, $I_2$, ..., In, and a control circuit 508, 510, ..., 512 that receives a reference voltage pair $V_{th1+}/V_{th1-}$, $V_{th2+}/V_{th2-}$, ..., $V_{thn+}/V_{thn-}$ from a reference voltage generator 514. Each control circuit 508, 510, ..., 512 is configured for selectively connecting its associated current source to the power supply output 520 as a function of a monitored voltage $V_{mon}$ and its associated reference voltage pair. Although the same monitored voltage $V_{mon}$ is provided to each stage of the circuit 500 of FIG. 5, one or more stages could alternatively receive a different monitored voltage as compared to another stage of the circuit.

More specifically, in the circuit 500 of FIG. 5, each control circuit 508, 510, ..., 512 is configured for selectively connecting its associated current source to the power supply output as a function of the monitored voltage $V_{mon}$ and a difference between the two reference voltages of its associated reference voltage pair. Further, in the particular implementation shown in FIG. 5, the monitored voltage $V_{mon}$ is the output voltage $V_o$. The number of stages employed in the circuit 500 can be adjusted as necessary for any given application of the invention.

Similar to the circuit 200 of FIG. 2, each control circuit 508, 510, ..., 512 includes a comparator CP1, CP2, ..., CPn, two differential amplifiers A1/A11, A2/A21, ..., An/An1, and two switches S11/S12, S21/S22, ..., Sn1/Sn2. Further, the reference voltage generator 514 includes a voltage source 516, a differential amplifier Ar1, and a voltage divider circuit 518 that includes multiple resistor pairs R0+/R0−, R1+/R−, ..., Rn+/Rn−.

The reference voltage Vref, the gain of the amplifier Ar1 (including a unity gain), and the value of each resistor in the voltage divider circuit 518 can be selected as necessary to provide desired voltage values for each reference voltage pair $V_{th1+}/V_{th1-}$, $V_{th2+}/V_{th2-}$, ..., $V_{thn+}/V_{thn-}$. For example, the circuit 500 can be configured such that the difference between reference voltages $V_{th1+}$ and $V_{th1-}$ is equal to the desired output voltage $V_o$, the difference between reference voltages $V_{th2+}$ and $V_{th2-}$ is somewhat less than the desired output voltage $V_o$, the difference between reference voltages $V_{th3+}$ and $V_{th3-}$ is further less than the desired output voltage $V_o$, and so on. As a result, as the output voltage $V_o$ continues to drop below a desired voltage value, additional current sources are incrementally coupled to the output terminal 520 as necessary to adjust the output voltage $V_o$ to the desired level. In this manner, the circuit 500 can provide a variable output current $I_o$ as necessary to maintain a relatively constant voltage across a variable load.

Further, similar to the circuit 200 of FIG. 2, in the exemplary circuit of FIG. 5, the resistors in each resistor pair of the voltage divider circuit 518 have the same resistance value as one another. As a result, each reference voltage pair constitutes a differential reference voltage that is converted to a single ended reference voltage common to the local ground by its associated differential amplifier A11, A21, ..., An1. As noted above, this approach simplifies the circuit design. Alternatively, different resistance values can be employed for the resistors in the voltage divider circuit 518.

Also similar to the circuit 200 of FIG. 2, the voltage divider circuit 518 in the exemplary circuit 500 of FIG. 5 is preferably ungrounded, and the voltage source 516 and the amplifier Ar1 are preferably grounded in the same physical region of the circuit. As a result, the difference between each reference voltage pair is relatively stable and non-fluctuating, even if the ground voltage in the vicinity of the voltage source 516 and the amplifier Ar1 varies due to noise or other influences.

As shown in FIG. 5, and similar to the circuit of FIGS. 2 and 4, the voltage divider circuit 518 includes a first voltage rail that includes resistors R0+, R1+, ..., Rn+ and a second voltage rail that includes resistors R0−, R1−, ..., Rn−. In the case where the resistors in each resistor pair have equal values and the voltage divider circuit 518 is ungrounded, the first voltage rail provides positive reference voltages $V_{th1+}$, $V_{th2+}$, ..., $V_{thn+}$ and the second voltage rail provides negative reference voltages $V_{th1-}$, $V_{th2-}$, ..., $V_{thn-}$.

Preferably, the reference voltage $V_{ref}$ provided by the voltage source 516 is relatively large so as to provide each reference voltage pair with a good signal-to-noise (S/N) ratio. For example, the reference voltage $V_{ref}$ can be two or three times as great as the maximum output voltage $V_o$ of the circuit 500, or even greater.

In the exemplary circuit implementation shown in FIG. 5, each current source 502, 504, ..., 506 is a constant current source for providing a different current level than the other current sources. Alternatively, other types of current sources and/or current levels can be employed. Further, one or more of the current sources 502, 504, ..., 506 can provide a negative current for providing a negative output voltage $V_o$, if desired.

Figure 6:
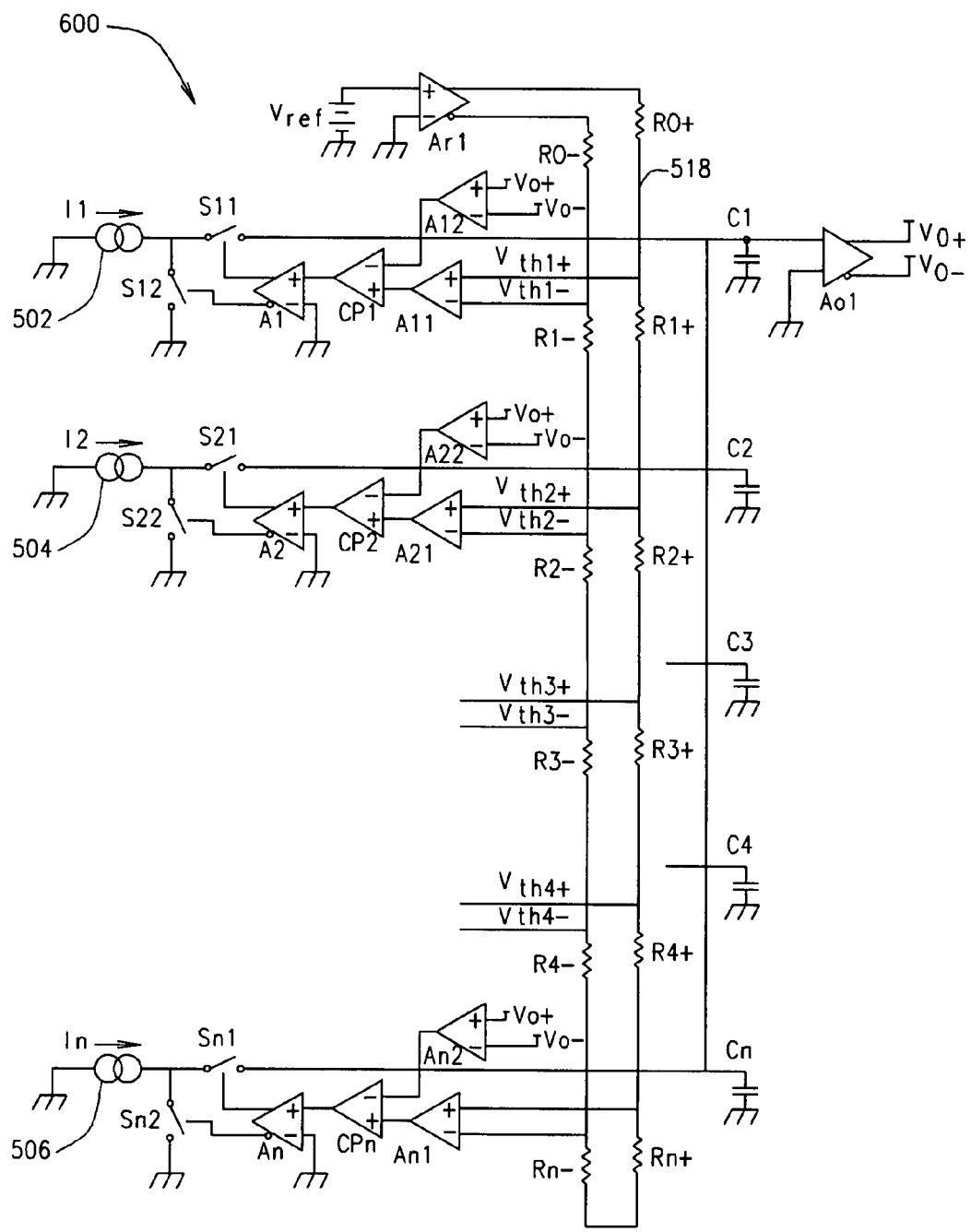
FIG. 6 is a circuit diagram illustrating an exemplary implementation of a power supply according to a fourth embodiment of the invention.

FIG. 6 illustrates an exemplary circuit implementation of a power supply 600 according to a fourth embodiment of the present invention. The circuit 600 is similar to the circuit 500 of FIG. 5, except for the addition of the differential amplifier Ao1 for converting the output voltage $V_o$ into a differential output voltage $V_{o+}/V_{o-}$, and differential amplifiers A12, A22, ..., An2 which convert the differential output voltage back into a single ended voltage adjacent their respective comparators CP1, CP2, ..., CPn. In this manner, the monitored voltage (in this case the output voltage $V_o$) can be detected at one location and accurately provided to the comparators at other locations irrespective of any variations in the ground voltage at these various locations in the circuit 600.

When describing elements or features of the present invention or embodiments thereof, the articles "a", "an", "the" and "said" are intended to mean there are one or more of such elements or features. The terms "comprising", "including" and "having" are intended to be inclusive and mean there may be additional elements or features beyond those specifically described.

Those skilled in the art will recognize that various changes can be made to the exemplary embodiments and implementations described above without departing from the scope of the present invention. Accordingly, all matter contained in the above description or shown in the accompanying drawings should be interpreted as illustrative and not in a limiting sense.

What is claimed is:

1. A power supply comprising at least one current source for providing current, a reference voltage generator including a differential amplifier and an ungrounded voltage divider circuit coupled to outputs of the differential amplifier for providing a first constant reference voltage and a second constant reference voltage, an output, and a control circuit for selectively coupling the current to the output as a function of a comparison of a monitored voltage with a difference between the first constant reference voltage and the second constant reference voltage.

2. The power supply of claim 1 wherein the first constant reference voltage and the second constant reference voltage are equal but opposite voltages.

3. The power supply of claim 1 wherein the monitored voltage is a voltage at the power supply output.

4. The power supply of claim 1 wherein the control circuit includes a differential amplifier having inputs coupled to the first constant reference voltage and the second constant reference voltage.

5. The power supply of claim 4 wherein the control circuit includes a comparator having inputs coupled to the monitored voltage and an output of the control circuit's differential amplifier.

6. The power supply of claim 5 wherein the control circuit includes at least one switch and a switch driver, the switch driver having an input coupled to an output of the comparator and at least one output coupled to said at least one switch for selectively coupling the current source to the power supply output.

7. The power supply of claim 1 wherein the reference voltage generator includes a voltage source coupled to an input of the differential amplifier.

8. The power supply of claim 7 wherein the voltage source provides a voltage at least twice as great as a maximum output voltage of the power supply.

9. The power supply of claim 1 further comprising a voltage monitor circuit including a first differential amplifier having an input coupled to the power supply output for generating a differential output voltage pair, and a second differential amplifier for generating the monitored voltage from the differential output voltage pair.

10. A power supply comprising a plurality of current sources, a reference voltage generator including a differential amplifier and an ungrounded voltage divider circuit coupled to outputs of the differential amplifier for providing a plurality of constant reference voltage pairs, an output, and a plurality of control circuits each associated with a different one of the current sources and a different one of the constant reference voltage pairs, each constant reference voltage pair including two constant reference voltages, each control circuit selectively connecting its associated current source to the power supply output as a function of a comparison of a monitored voltage with a difference between the two constant reference voltages in its associated constant reference voltage pair.

11. The power supply of claim 10 wherein each control circuit includes a differential amplifier having inputs coupled to The control circuit's associated constant reference voltage pair.

12. The power supply of claim 11 wherein each control circuit includes a comparator having inputs coupled to the monitored voltage and an output of the control circuit's differential amplifier.

13. The power supply of claim 10 wherein the reference voltage generator includes a voltage source coupled to an input of the differential amplifier.

14. The power supply of claim 13 wherein the voltage source provides a voltage at least twice as great as a maximum output voltage of the power supply.

15. The power supply of claim 10 wherein the two constant reference voltages in each constant reference voltage pair are equal but opposite voltages.

16. The power supply of claim 10 wherein the voltage divider circuit includes a plurality of resistances for producing the plurality of constant reference voltage pairs.

17. The power supply of claim 10 further comprising a differential amplifier having an input coupled to the power supply output for generating a differential output voltage and a plurality of amplifiers each associated with a different one of the control circuits for generating the monitored voltage from the differential output voltage.

18. The power supply of claim 10 wherein each current source is a constant current source.

19. The power supply of claim 10 further comprising a plurality of capacitors coupled between the power supply output and ground.

20. A power supply comprising at least one current source, a reference voltage generator including a differential amplifier and an ungrounded voltage divider circuit coupled to outputs of the differential amplifier for providing a first constant reference voltage and a second constant reference voltage, an output, a circuit for comparing a monitored voltage with a difference between the first constant reference voltage and the second constant reference voltage, and at least one switch for selectively coupling the current source to the output in response to said circuit.

21. The power supply of claim 20 wherein the at least one switch selectively couples the current source to the output when the output of the comparing circuit exceeds a predetermined value.

22. The power supply of claim 20 wherein the monitored voltage is a power supply output voltage.

23. The power supply of claim 21 further comprising a voltage monitor circuit for generating a differential output voltage from an output voltage of the power supply, and for generating the monitored voltage from the differential output voltage.

24. The power supply of claim 21 wherein the predetermined value is a local ground voltage.

25. A power supply comprising means for generating current, means for monitoring a voltage, a differential amplifier and an ungrounded voltage divider circuit coupled to outputs of the differential amplifier for generating a first constant reference voltage and a second constant reference voltage, and means for selectively coupling the current generating means to an output of the power supply as a function of a comparison of the monitored voltage with a difference between the first constant reference voltage and the second constant reference voltage.

26. The power supply of claim 25 wherein the first constant reference voltage and the second constant reference voltage are equal but opposite voltages.

27. The power supply of claim 25 wherein the monitoring means includes means for generating a differential output voltage from an output voltage of the power supply and means for generating the monitored voltage from the differential output voltage.

28. The power supply of claim 25 wherein the monitored voltage is a power supply output voltage.

29. A power supply comprising an output, a plurality of current stages for selectively providing current to the output, and a reference voltage generator including a differential amplifier and an ungrounded voltage divider circuit coupled to outputs of the differential amplifier for providing a differential reference voltage to each current stage, the reference voltage generator configured to generate each differential reference voltage from first and second constant reference voltages provided by the ungrounded voltage divider circuit.

30. The power supply of claim 7, wherein the voltage divider circuit includes at least two resistors having about the same resistance value.

31. The power supply of claim 29 wherein each current stage is selectively coupled to the output in response to a comparison of a power supply output voltage with the differential reference voltage provided to the current stage.

* * * * *